Patented Jan. 5, 1954

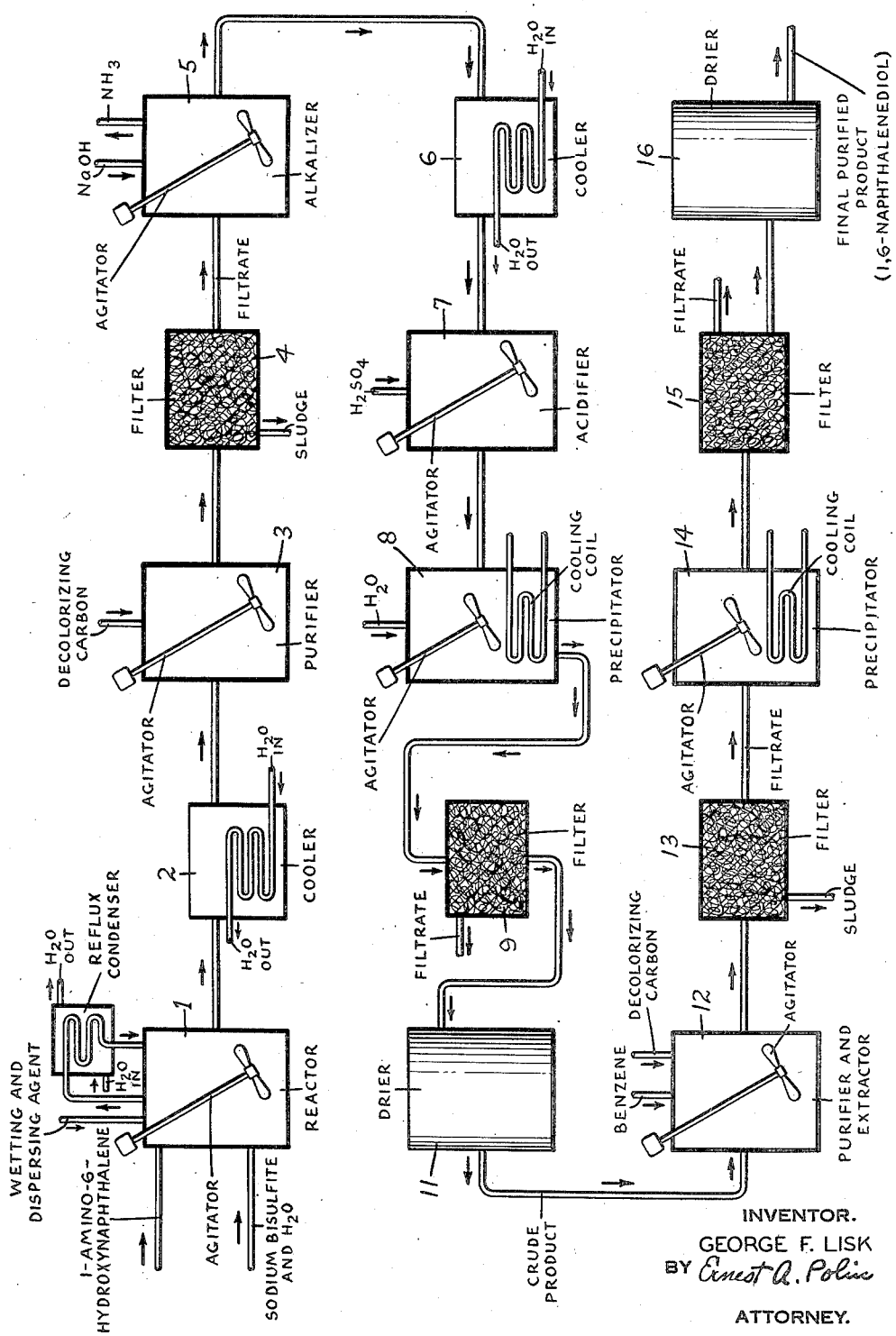

2,665,313

UNITED STATES PATENT OFFICE 2,665,313

PRODUCTION OF 1,6-NAPHTHALENEDIOL

George F. Lisk, Buffalo, N. Y., assignor to Allied Chemical & Dye Corporation, New York, N. Y., a corporation of New York Application October 2, 1951, Serial No. 249,418

7 Claims. (Cl. 260—621)

This invention relates to a process for the manufacture of 1,6-naphthalenediol (1,6-dihydroxynaphthalene), and more particularly refers to the conversion of 1-amino-6-hydroxynaphthalene to 1,6-naphthalenediol in the presence of an aqueous bisulfite.

The potentially cheapest and most convenient piror art process for the manufacture of 1,6-naphthalenediol appears to be disclosed in P. B. Report 74051 and BIOS Final Report 1152. According to these reports, 1,6-naphthalenediol can be obtained in yield of 80% of theory by the caustic alkali fusion of 1,6-naphthalenedisulfonic acid, obtained commercially as a by-product in the manufacture of 1,5-naphthalenedisulfonic acid by the disulfonation of naphthalene. However, by use of the procedure and special operating equipment of the type described in the reports, I have been able to produce 1,6-naphthalenediol from commercial 1,6-napthalenedisulfonic acid, obtained as a by-product in the manufacture of 1,5-naphthalenedisulfonic acid, in yields which average considerably less than 50% of theory. In further tests, employing a purified 1,6-naphthalenedisulfonic acid, separated as the soluble barium salt by the method of Ambler and Scanlon, Ind. Eng. Chem., vol. 19 (1927), page 427, from the reaction mixture produced in the disulfonation of naphthalene to 1,5-naphthalenedisulfonic acid, I have obtained 1,6-naphthalenediol in yields which average only about 50% of theory. Furthermore, the 1,6-naphthalenediol produced in either case, even when purified by recrystallization from benzene, usually possesses a maximum melting point of only 135° C. as compared to a melting point for the pure product of about 137° to 138° C., thereby indicating the presence in the product of an appreciable amount of impurities. These impurities which I believe are primarily isomeric naphthalenediols are extremely difficult to separate from the 1,6-naphthalenediol.

Several other methods for producing 1,6-naphthalenediol have been proposed. These methods, however, are objectionable in that they are complicated, or use expensive starting materials, or do not produce 1,6-naphthalenediol in sufficiently high yield or pure form to be acceptable for some commercial purposes.

An object of this invention is to provide a simple and economical method for preparing 1,6-naphthalenediol. Another object is to provide a method for preparing 1,6-naphthalenediol of excellent purity and in good yield. Other objects and advantages of the invention will appear hereinafter.

According to the present invention, 1,6-naphthalenediol can be advantageously produced by heating 1-amino-6-hydroxynaphthalene with an aqueous solution of a water-soluble, inorganic bisulfite and subjecting the reaction mixture to alkaline hydrolysis and subsequent acidification to form 1,6-naphthalenediol.

The starting material in my process, 1-amino-6-hydroxynaphthalene, is a relatively cheap and commercially available intermediate, which may be manufactured by alkali fusion of 1,6-Cleve's acid (1-naphthylamine-6-sulfonic acid).

At least 2 mols and preferably 5 to 10 mols of bisulfite per mol of 1-amino-6-hydroxynaphthalene are employed in the reaction of my process. Although more than 10 mols of bisulfite may be used, such proportions are preferably not employed for reasons of economy.

Sodium bisulfite by reason of availability and relatively low cost as its equivalent sodium metabisulfite is the preferred bisulfite reactant of my process; however, other water-soluble, inorganic bisulfites, for example other alkali or alkaline earth metal bisulfites such as ammonium, potassium and calcium bisulfites (including their equivalent metabisulfites) may be suitably employed in place of the sodium bisulfite.

According to my preferred process, 1 mol of 1-amino-6-hydroxynaphthalene is heated with from about 5 to 10 mols of a concentrated, aqueous solution of an alkali metal bisulfite, for example 20–40% by weight concentration, until substantially all of the 1-amino-6-hydroxynaphthalene is reacted. This reaction usually requires 20–40 hours at about 95–105° C. and results in the formation of an intermediate compound which is probably a bisulfite addition product.

The reaction mixture thus obtained is made alkaline, preferably at a pH greater than 9, with a suitable alkali, for example sodium hydroxide. The resulting alkaline mixture is then heated, preferably at a temperature of about 60–95° C., to hydrolyze the intermediate compound and to expel ammonia formed during the hydrolysis.

After the ammonia has been removed, the mixture is rendered acid, preferably at a pH less than 4, with a suitable acid, for example sulfuric acid or hydrochloric acid. A temperature of about 25–50° C. is preferably used in this step of my process. Although a higher temperature, for example about 70–75° C., may be employed, a somewhat lower yield of 1,6-naphthalenediol results.

Instead of basifying the reaction mixture obtained from the reaction of 1-amino-6-hydroxynaphthalene with inorganic bisulfite, excess unreacted bisulfite may be first destroyed by adding just enough suitable acid such as sulfuric acid to convert the bisulfite to sulfurous acid and then heating to dispel the sulfur dioxide. The resulting mixture may then be subjected to alkaline hydrolysis and acidified to produce the 1,6-naphthalenediol. This manner of operation, however, is not preferred since the initial acid addition may be sufficient to cause partial decomposition of the intermediate product back to the aminonaphthol starting material with resultant lowering of yield of the desired 1,6-naphthalenediol.

To isolate the 1,6-naphthalenediol, the alkaline hydrolysis liquor after acidification may be cooled to room temperature, and salted if necessary, for example with sodium sulfate or sodium chloride, until the mother liquor has a density of at least 25° Bé. at 33° C. Under these conditions the 1,6-naphthalenediol is substantially completely precipitated and may be separated by any appropriate manner, as by filtration, centrifuging, or the like.

The crude product thus obtained contains inorganic salts and organic impurities. It may advantageously be purified by recrystallization from hot benzene, preferably in the presence of decolorizing carbon. The inorganic salts, insoluble in the hot benzene solution, may be separated by filtration, and the filtrate then cooled, for example to 10° C., to precipitate the purified product. In this manner substantially pure 1,6-naphthalenediol can be obtained in good yield as a white crystalline product having a melting point of 137°–138.5° C.

Although I prefer to employ benzene as the purification solvent, other low-boiling, inert, water-immiscible solvents may be used, such as toluene and chloroform.

It is indeed a surprising result that the process of my invention produces 1,6-naphthalenediol of excellent purity and in good yield, especially in view of the well known tendency of 1,6-naphthalenediol to decompose and/or oxidize to tars in aqueous medium.

The high quality and relatively low cost of 1,6-naphthalenediol made by my process qualify the product for use particularly for the manufacture of synthetic forms of various steroid hormones derivable from 1,6-naphthalenediol.

The accompanying drawing is a diagrammatic flow sheet suitable for practicing the present invention. Referring to the drawing, the invention will be illustrated by the following example wherein parts are by weight.

*Example*

An agitated mixture of 159 parts of 1-amino-6-hydroxynaphthalene of 91–95% purity (M. P. 183–5° C.), 683 parts of sodium bisulfite as sodium metabisulfite, about 2.6 parts of Nacconol NR (a commercial wetting and dispersing agent) and 1300 parts of water was heated to boiling under reflux (about 105° C.) in reactor 1 for about 20 hours. The reaction mixture was cooled to 85°–90° C. in cooler 2, mixed with 10 parts of Nuchar C–190 Neutral (a commercial decolorizing carbon) in purifier 3, heated at 90°–95° C. for one-half hour and sludge filtered in filter 4, and the filter cake was washed with about 200 parts of hot water (90° C.).

The filtrate was adjusted to a pH above 11 in alkalizer 5 by adding 660 parts of 50% aqueous sodium hydroxide, and the alkaline mixture was heated at 90°–95° C. until no further ammonia was evolved (about one hour). The mixture was then cooled to 45–50° C. in cooler 6 and adjusted to a pH below 1 in acidifier 7 by adding 1380 parts of 50° Bé. sulfuric acid. The acidified mixture was briefly agitated at 45–50° C., then diluted with about 400 parts of water in precipitator 8, cooled to 32–33° C., and agitated at that temperature for about one hour, when the 1,6-naphthalenediol was almost entirely precipitated (mother liquor=27° Bé.). The precipitate was separated as a cake by filtration in filter 9, and the cake was sucked free of mother liquor and dried in drier 11 at 50° C. in vacuo (about 50 mm. Hg absolute pressure). 143.4 parts of dark, crude product containing 1,6-naphthalenediol together with organic impurities and inorganic salts, chiefly sodium sulfate, were obtained.

The crude product thus obtained was dissolved in about 3500 parts of benzene and the solution was mixed with about 14 parts of Nuchar C–190 Neutral in purifier and extractor 12, heated to boiling for about one-half hour and filtered while hot in filter 13. The filtrate was cooled to 10° C. in precipitator 14 to precipitate the 1,6-naphthalenediol, which was separated by filtration in filter 15 and dried in vacuo at 50° C. in drier 16. 84.6 parts of 1,6-naphthalenediol were thus obtained as a white crystalline product melting at 137°–138.5° C. This amount of product corresponds to 55.7% of the theoretical yield based on initial 1-amino-6-hydroxynaphthalene of 95% purity.

Variations and modifications may be made within the scope of this invention; hence, the details of the foregoing example are to be interpreted as illustrative rather than in a limited sense.

I claim:

1. A process for the preparation of 1,6-naphthalenediol which comprises heating 1-amino-6-hydroxynaphthalene with an aqueous solution of a water-soluble, inorganic bisulfite and subjecting the reaction mixture to alkaline hydrolysis and subsequent acidification.

2. A process for the preparation of 1,6-naphthalenediol which comprises heating 1-amino-6-hydroxynaphthalene with an aqueous solution of a bisulfite of the group consisting of alkali and alkaline earth metal bisulfites, in mol ratio of at least 2 mols of bisulfite for every mol of 1-amino-6-hydroxynaphthalene, subjecting the reaction mixture to alkaline hydrolysis and subsequent acidification, separating the crude 1,6-naphthalenediol formed, extracting said crude 1,6-naphthalenediol with a low-boiling, inert water-immiscible solvent and recovering substantially pure 1,6-naphthalenediol from said solvent.

3. A process for the preparation of 1,6-naphthalenediol which comprises heating 1-amino-6-hydroxynaphthalene with an aqueous solution of an alkali metal bisulfite, in mol ratio of at least 2 mols of bisulfite for every mol of 1-amino-6-hydroxynaphthalene, subjecting the reaction mixture to alkaline hydrolysis and subsequent acidification, separating the crude 1,6-naphthalenediol formed, extracting said crude 1,6-naphthalenediol with a low-boiling, inert, water-immiscible solvent and recovering substantially pure 1,6-naphthalenediol from said solvent.

4. A process for the preparation of 1,6-naphthalenediol which comprises reacting 1-amino-6-hydroxynaphthalene with an aqueous solution of an alkali metal bisulfite, in mol ratio of at least 2 mols of bisulfite for every mol of 1-amino-6-hydroxynaphthalene until substantially all of the 1-amino-6-hydroxynaphthalene is reacted, rendering the reaction mixture alkaline to a pH above 9 and heating to expel ammonia, rendering the alkaline reaction mixture acid to a pH below 4, separating the crude 1,6-naphthalenediol formed, extracting said crude 1,6-naphthalenediol with a low-boiling, inert, water-immiscible solvent and recovering substantially pure 1,6-naphthalenediol from said solvent.

5. A process for the preparation of 1,6-naphthalenediol which comprises reacting 1-amino-6-hydroxynaphthalene with an aqueous solution of sodium bisulfite, in mol ratio of at least 2 mols of sodium bisulfite for every mol of 1-amino-6-hydroxynaphthalene until substantially all of the 1-amino-6-hydroxynaphthalene is reacted, rendering the reaction mixture alkaline to a pH above 9 and heating to expel ammonia, rendering the alkaline reaction mixture acid to a pH below 4, separating the crude 1,6-naphthalenediol formed, extracting said crude 1,6-naphthalenediol with benzene and recovering substantially pure 1,6-naphthalenediol from said benzene.

6. A process for the preparation of 1,6-naphthalenediol which comprises reacting 1-amino-6-hydroxynaphthalene with an aqueous solution of sodium bisulfite, in mol ratio of 5 to 10 mols of bisulfite for every mol of 1-amino-6-hydroxynaphthalene until substantially all of the 1-amino-6-hydroxynaphthalene is reacted, rendering the reaction mixture alkaline to a pH above 9 and heating to expel ammonia, rendering the alkaline reaction mixture acid to a pH below 4, separating the crude 1,6-naphthalenediol formed, extracting said crude 1,6-naphthalenediol with benzene and recovering substantially pure 1,6-naphthalenediol from said benzene.

7. A process for the preparation of 1,6-naphthalenediol which comprises reacting 1-amino-6-hydroxynaphthalene with a concentrated aqueous solution of sodium bisulfite, in mol ratio of 5 to 10 mols of bisulfite for every mol of 1-amino-6-hydroxynaphthalene, at a temperature of about 95–105° C. until substantially all of the 1-amino-6-hydroxynaphthalene is reacted, rendering the reaction mixture alkaline to a pH above 9 and heating at a temperature of about 60–95° C. to expel ammonia, rendering the alkaline reaction mixture acid to a pH below 4 at a temperature of about 25–50° C., separating the crude 1,6-naphthalenediol formed, extracting said crude 1,6-naphthalenediol with benzene and recovering substantially pure 1,6-naphthalenediol from said benzene.

GEORGE F. LISK.

References Cited in the file of this patent

Bucherer et al., Chem. Abstracts, vol. 16, page 1949 (1922), 1 p. only.

Kogan et al., Chem. Abstracts, vol. 32, Col. 7031 (1938), 1 p. only.